United States Patent Office
3,811,992
Patented May 21, 1974

3,811,992
FIRE-PROOF LAMINATED PLYWOOD CORE
Takashi Handa and Minoru Saito, Tokyo, Japan, assignors to Adachi Plywood Co., Ltd., Tokyo, Japan
No Drawing. Continuation-in-part of application Ser. No. 37,418, Apr. 15, 1970, which is a continuation of application Ser. No. 607,621, Jan. 6, 1967, both now abandoned. This application Dec. 8, 1971, Ser. No. 206,148
Claims priority, application Japan, Jan. 14, 1966, 41/1,812
Int. Cl. B32b 21/06
U.S. Cl. 161—267                                         4 Claims

ABSTRACT OF THE DISCLOSURE

Provided is a composition for rendering the core of a laminated plywood structure fire-proof. The composition in paste form comprises a viscosity builder, which is admixed with an aqueous solution consisting of tricresyl, glycerine, or guanidine phosphate, ammonium halide, zinc chloride, urea, or a compound thereof, a small amount of ammonium sulfate, a weak acid compound such as boric acid, ammonium borate or ammonium phosphate and a small amount of an antimony compound. After pretreating the core with a silicate or deliquescent composition and if necessary, providing a large number of scars on the surface of the core, the composition is applied to the surface of the core whereinafter permeation of the composition into the core is effected. After drying of the core, the untreated thin front and back veneers are applied by gluing to the surfaces of the core, thus providing a fire-proof plywood structure of a self-extinguishing untreated surface veneer and treated core, which has excellent varnish-brushability.

RELATED APPLICATIONS

This application is a continuation-in-part of application Ser. No. 37,418 filed Apr. 15, 1970, and now abandoned, which in turn is a streamlined continuation of application Ser. No. 607,621 filed Jan. 6, 1967 and now abandoned.

This invention relates to fire-proof plywood structures. More particularly, this invention relates to compositions and processes for manufacturing fire-proof plywood structures.

The prior art has long attempted to provide fire-proof plywood structures for the construction industry. Generally speaking, the art has achieved this purpose with some modicum of success by the use of conventional inorganic acid substances alone or admixed with organic acid substances and impregnating same into the core of a plywood structure to achieve a degree of fire-proofing. Examples of such known fire-proofing substances include ammonium sulfate, ammonium phosphate, boric acid, acid metal salts, organic phosphoric acid esters, and the like.

Although the art has been able, through the use of the above substances, to obtain a modicum of fire-proofing in plywood structures, many problems attend the use of these materials. For example, the above materials are extremely slow to permeate the core, thus slowing down production. Once permeation does take place, it is often non-uniform especially where tylosis exists in the core panel. Large quantities of the agents, because of the slowness of permeation and the uncertainty of the permeation, usually have to be used. Many of these materials, furthermore, are detrimental to the wood and actually deteriorate same after long periods of use.

Many of the problems caused by these prior art materials stem from the fact that the agents used are acidic, hygroscopic and dehydrate the wood when used therein. The wood, in order to make up for the dehydration caused by these hygroscopic agents, must absorb water from the moisture in the ambient air. Such absorption of moisture from the ambient air tends to discolor the plywood, rust and stain connecting members such as nails used to attach the plywood to its superstructure, dilutes the amount of agent used in the wood, thus reducing its efficiency, and causes the wood to be damp and moist, thus not only corroding the wood but subjecting it to attack from insects and the like. In addition, the various agents, both because of their hygroscopic and acid nature, may actually have in many instances an adverse effect upon the glues used to attach the front and back veneers to the core structure. In this respect, the glues normally used in producing plywood are comprised of amino type resins or water soluble phenol resins, both of which are extremely sensitive to changes in the pH value of the fire-retardant agent caused by dehydration and the absorption of water.

The three most commonly used processes for impregnating a plywood core are the immersion technique, the spreading technique, and the pressure injecting technique. All three of these techniques are well known in the art. The most desirable technique to use from the point of view of economy is the spreading technique which sprays or brushes the fire-retarding agent upon either side of the core of the plywood structure and allows permeation to automatically take place. Because the known fire-retardant agents are so viscous in nature, their viscosity must be reduced by additives which affect the concentration of the fire-retarding agent, thus necessitating uneconomic and non-optimum practices in carrying out the spreading technique. The other two less desirable techniques must, therefore, be used when the prior art agents are employed. The immersion technique is limited, however, not only by the large amount of equipment and agent which must be presented, but also by the fact that as the agent displaces water in the core, the surrounding agent is diluted thereby, thus limiting the amount of effective agent presented in the core of the plywood structure. The least desirable of the known processes from the point of view of economy is the pressure injecting technique which is often extremely inefficient but must often be resorted to when using the prior art agents in order to insure that a sufficient amount of fire-retardant agent will be presented in the wood.

Once a plywood structure is formulated in accordance with the above technique using as the fire-retardant agents the prior art agents listed above, the plywood is generally fire-retardant and stable to a certain degree up to about 450° C. However, as can be analyzed, for example, by using the conventional vertical small size test furnace, after about 450° C., an excessive amount of carbon monoxide is generated inside the enclosed core, thus causing cracking of the surfaces of the structure. When cracking occurs, oxygen from the ambient air filters through the cracks which reacts with the carbon monoxide to form carbon dioxide. Since this reaction is exothermic, the amount of carbon monoxide released from the core increases, which in turn increases the exothermic action of carbon monoxide to carbon dioxide further increasing the temperature of the plywood structure. Thus, after about 450° C., little, if any, fire-retardance may be realized and in fact, combustion may be rapid and continuous. Thus, although the prior art agents provide for fire-retardance up to temperatures of about 400–450° C., at more elevated temperatures the conventional plywood has the limiting defect of being rapidly combustible on a continuous basis.

It is the purpose of this invention to provide a fire-retardant agent, plywood having that fire retardant agent impregnated therein, and processes for producing said plywood, which overcome the above-described problems in the art and therefore satisfy a long-felt need in this art.

Generally speaking, the fire-retardant compositions contemplated by ths invention comprise an ammonium halide and a urea compound. More preferably, the compositions also include an organo-phosphorus or an organo-sulfuric compound capable of generating a vapor pressure from pyrolysis above about 400° C., a metal halide compound, a sulfate compound, a weak acid, and optionally, a small amount of an antimony compound.

While the compositions of this invention may be employed alone to treat a plywood core and thus render it fire-retardant, it is preferred in many instances to pre-treat the core either with a specific silicate compound and/or with a deliquescent material. The deliquescent materials contemplated by this invention include the convention deliquescent materials such as urea, ammonium chloride, bromide or the like. It has been found that when a deliquescent material is employed so as to maintain the moisture content of the wood between about 80–150%, surface hardening when the fire-retardant compositions of this invention are later applied is prevented, and a better and more even gradation of retardant migration into the plywood core is provided. Such an even gradation is important for excellent fire-retardancy since ignition is first induced near the glue lines of the plywood when thin surface veneers are used.

The silicate pretreatment compound is employed in this invention to aid the permeation of the fire-retardant compositions into the core. This is generally thought to be effected by a pH control. Generally speaking the silicate composition should be employed in an amount of about 1–22 parts by weight per 100 parts by weight of the fire-retardant composition later applied in order to effect its intended purpose. In addition to aid migration, the silicates employed generally polymerize during heating thus forming a crack-filling surface layer on the core which serves, in itself, as a fire-retardant by preventing the intrusion of oxygen into the system and enclosing the anti-catalyst vapors (later explained) for optimum effect.

While the silicates employed eventually act as fire-retardants, during their decomposition, and especially when the silicates are the alkoxysilanes, they tend to form volatile compounds which have somewhat of a tendency to ignite at relatively low temperatures. It has been found, however, that when the silicates are employed with deliquescent materials and particularly ammonium bromide, this minor ignition problem is virtually eliminated. Thus, in the preferred embodiments of this invention, the silicate composition also includes a deliquescent material such as $NH_4Br$ which will eliminate any tendency of the by-products of silicate decomposition to flash or ignite.

Examples of the silicate compounds useful in pretreatment include the alkali silicates such as sodium silicate and the alkoxysilanols such as ethoxy, butoxy, tertiary butoxy-silanols. The alkoxysilanols, and preferably those specifically mentioned decompose to make a glassy crack-filling silicate polymer at above about 250° C.

Returning to the fire-retardant compositions of this invention:

Examples of the organic phosphorus compounds employed therein, include: tricresyl phosphate, glycerine phosphate, and guanidine phosphate. Examples of the organo-sulfuric compounds include ammonium sulfamate, and the compounds represented by the formula $$(RO)_2SO_2$$

wherein R is an alkyl group of from 4 to 8 carbon atoms or a halogen-substituted phenyl group. Examples of such halogen-substituted phenyl groups include p-chlorobenzene, p-bromobenzene, 2,4-dichloro or dibromobenzene, and the like.

The ammonium halides contemplated for use in this invention include ammonium chloride, bromide, fluoride, and iodide.

The metal halide compounds contemplated by this invention include those metal halides wherein the metal ion has a valence of 2 or 3. Preferably, the metal halide contemplated for use in this invention is zinc chloride. Others include $ZnBr_2$ and $CaBr_2$. Generally speaking, chlorides other than those of zinc tend to adversely affect pH and are therefore less desirably employed. It has also been found that zinc chloride inhibits the formation of char.

Any of the well known urea compounds may be used in this invention. Examples of such compounds include urea, thiourea, dimethyl thiourea or monomethylolmelamine.

The sulfate compounds contemplated for use in this invention are preferably exemplified by ammonium sulfate. Other sulfates also applicable include vinyl-sulfate which will polymerize to stabilize the wood dimensions when heated.

The weak acid or acid compounds contemplated for use in this invention include any of the well known weak acids or salts thereof. Preferably, however, such compounds include a boron or phosphorus atom. Examples of preferred compounds for use in this invention which are either weak acids or weak acid compounds include boric acid, ammonium borate and ammonium phosphate.

The antimony compound contemplated for use in this invention is selected from the group consisting of the various antimony oxides or halides. Examples of such compounds include antimony trioxide and antimony chloride (e.g. antimony trichloride).

While the individual and relative amounts of the above ingredients may vary widely depending upon various factors known to the skilled artisan, the following compositional range, in weight percent, illustrates the range of ingredients contemplated:

| Preferred (percent): | Broad |
|---|---|
| 20~25 | 20–35% urea compound. |
| 15~20 | 10–20% ammonium halide. |
| 5~10 | 0–10% organo-phosphorus or sulphuric compound. |
| 5~10 | 0–10% metal halide. |
| 2~5 | 0–10% sulfate compound. |
| 1~3 | 0–5% weak acid or acid compound. |
| 1~2 | 0–3% antimony compound. |
| 10~17 | 0–17% sulfoxide. |
| 10~22 | 0–22% formaldehyde. |

The ingredients when thus combined, preferably as an aqueous paste or solution, form a unique fire-retardant agent when impregnated, by known techniques into the cores of plywood structures. In this respect, the metal halide compound, sulfate compound, weak acid or acid compound, and urea compound are used for their production of non-flammable gases when subjected to elevated temperatures. The organic phosphorus and organo sulfuric compound and ammonium halide are admixed with the non-flammable gas-forming ingredients because of their ability, when heated above about 400° C., to produce $X_2$, $POX_3$, and/or $SOX_3$ (X is a halogen atom, P is a phosphorus atom, S is a sulfur atom), which compounds when produced are effective as anti-catalytic agents upon the combustion reaction $CO + \frac{1}{2}O_2 \rightarrow CO_2$ in vapor phase as well as being anti-catalytic agents upon the formation of flammable gases which are produced from the pyrolysis of lignum, and the combustion reaction $C+\frac{1}{2}O_2 \rightarrow CO$ in solid phase. Thus, by the addition of these ingredients for their anti-catalytic effect when heated to a temperature above about 400° C., burning is extinguished at above these temperatures, contrary to the known prior art, even though the source of heat causing the fire is not removed. That is to say, the plywood, by the addition of these ingredients, is self-extinguishing even though the heat causing the fire is maintained thereupon.

It has been further found that the use of a small amount of an antimony compound as described above strengthens the self-extinguishing effect caused by the anti-catalytic properties of the products produced from these compounds upon heating them above about 400° C. Furthermore, and as stated above, it has also been found that the silicate used in pre-treatment also has the effect of forming complexes or metal compounds with the by-products of pyrolysis of the other compounds described above, which complexes or metal compounds tend to settle inside the core of the plywood to fill the openings within the structure. This filler, therefore, tends to reduce the air gap ratio of the core by thermal expansion under heating and thereby protects against unwanted oxygen filtering into the cracks to aid combustion. At the same time, the dissipation of the anti-catalytic vapors produced by pyrolysis is prevented by the silicate compound which, as stated, fills the cracks formed during heating.

The fire-retarding agents as above described, may be formulated in three distinct manners. Firstly, the ingredients may be admixed and dissolved in water to form a simple aqueous solution. As will be illustrated in the Examples which hereinafter follow, such a simple aqueous solution when impregnated into a core of plywood effects dramatic improvements over the prior art. Preferably, however, the compositions of this invention are formulated by first pre-reacting under anhydrous conditions the ammonium halide with the metal halide and urea compound in a sulfoxide (e.g., preferably dimethyl sulfoxide). The resulting sulfoxide reaction solution is thereafter added to the other ingredients to form an aqueous solution. It has been found that by pre-reacting the above-named ingredients with sulfoxide, the permeation time of the fire-retarding agents of this invention into the core of a known plywood structure, is decreased by about one-half.

Still more preferably, and in a third way of formulating the compositions of this invention, a small amount of formaldehyde is added to the sulfoxide mixture as described above. By pre-reacting formaldehyde with the ammonium halide-metal halide compound and urea, the hygroscopicity of these compounds, which property is detrimental as described above to the plywood, is greatly reduced. While the sulfoxide pre-reaction product also decreases the hygroscopicity of these materials, the combination has proved to be even more effective in this regard.

The sulfoxide, in combination with the formaldehyde, also serves to insure that the condensation product formed by the formaldehyde and the above-described ingredients, will be soluble in water, thus enabling a water-soluble solution to be formed.

The reduction of hygroscopicity effected by formaldehyde is exemplified as follows: 1 mole of ammonium bromide and zinc chloride, or a mixture of ammonium bromide and ammonium iodide and 1.5-3 moles urea are heated under anhydrous conditions to a temperature of about 130-140° C. From 3-6 moles formaldehyde are added and heated at 80-90° C. to form a condensation product, which reaction mixture has little if any hydroscopicity when exposed to high humidity and does not resolute (decompose) in water but only in special organic solvents (from this fact low hygroscopicity is evident).

Furthermore, such a reaction and condensation product are brought to thermal cracking above 250° C. and react in the same way with ammonium halide-metal halide compound and urea or the compound thereof.

The above composition may be effectively used in the conventional spreading technique for impregnating cores of known plywood structures. Such cores are generally formed of any well known hardwood usually referred to as lignum such as lignum vitae, an example of which is mahogany.

Preferably, the above-described compositions are used in the spreading technique as pastes which are applied to a surface of the plywood core and allowed to impregnate said core by known mechanisms. In order to formulate such a paste, one or two kinds of viscosity builders such as starch, methyl cellulose, carboxymethyl cellulose, sodium alginate and polyvinyl alcohol are used to render the aqueous solution at the necessary viscosity so as to form a paste which may be efficiently spread in a coating either by brush or roll spreading upon the surface. Generally speaking, the paste will have a viscosity of approximately 700-800 cps. which is usually achieved by admixing about 1% by weight of said viscosity builder with the aqueous solution.

This invention contemplates, in certain circumstances where speed of permeation becomes ultimately important, to first score the core with a multitude of grooves by conventional techniques, either before pre-treatment or after it, thus increasing the permeation rate.

Any of the well known methods of applying the fire-retarding agent to a raw core are contemplated for use in this invention. However, as stated above, the paste spreading technique is the most preferred. Generally speaking, this technique is carried out in the following manner:

The plywood core, of any standard material, shape and size is first run through a conventional rotary lathe and tenderizing operation to score the surface thereof. The core is then passed between two roller spreaders which spread upon both surfaces of the core a pre-treating composition preferably comprised of both a deliquescent and silica material. The cores are then stacked and allowed to stand for about 10-20 hours at room temperature (20-25° C.) to allow the pre-treatment to take effect. The cores are then passed between a set of roll spreaders to apply the fire-retardant composition of this invention. The spreader is usually set to apply about 230 g./m.² and is operated at about 40° C. The so-treated cores are then stacked for about 20 hours at 25° C. to allow the fire-retardant material to impregnate the core. The cores are then oven dried at about 160° C. for about 20-25 minutes to reduce the water content of the core to below about 10%.

Once a core is prepared in the above-described manner, any of the well known adhesives heretofore used in the prior art may be used in accordance with this invention to secure the various laminae (veneers) to the core surfaces. A preferred glue composition for the purposes of this invention comprises a water-soluble adhesive composed of the mixture of amino type resin and phenol resin which is stable, water resistant, heat resistant and weather resistant and which is relatively low in cost. Another preferred glue for the purposes of this invention comprises a water soluble condensation resin comprised of 1-2 moles of one or two kinds of amino compounds, for example, urea or melamine, and ½-⅓ mole of one or two kinds of phenol compound, for example, phenol or resorcinol. All of these glues have excellent heat resistance and as stated hereinabove are not degraded by the unique fire-retardant agents of the subject invention.

In the case of amino type resins or resol type water soluble phenol resins commonly used for gluing, the pH of these adhesives is in the acidic range and curing thereof takes place rapidly because of the catalytic effect of the fire-retardant agent when heated to the curing temperature of the resins.

The following examples are presented by way of illustration rather than limitation. The designation "phr." refers to parts by weight.

EXAMPLE I

Two pre-treatment compositions which contain sufficient crack-filling silicate are prepared into slurry form for application by a conventional roller-spreader operated at a line speed of 70 meters/min.

A

| Ingredient: | Weight percent |
| --- | --- |
| Sodium silicate | 18 |
| Ammonium sulfate | 5 |
| Water | 77 |

B

| | |
| --- | --- |
| Sodium silicate | 19.5 |
| Ammonium bromide | 5.5 |
| Water | 75.0 |

The ammonium sulfate and bromide are present to reduce the rather high pH of sodium silicate which would otherwise tend to dissolve the lignum components of the wood thus weakening it such that the final pH of the composition is (A) 10.55 and (B) 11.12. In addition, ammonium bromide will coprecipitate with the silica during decomposition (heating after application) to act as a fire-retardant. Thus composition B is particularly preferred.

EXAMPLE 2

Tricresyl phosphate or glycerine phosphate (10 phr.) or guanidine phosphate (17 parts/hundred), ammonium bromide or ammonium iodide (10 phr.), zinc chloride (10 phr.), boric acid (5 phr.), ammonium sulfate (5 phr.) and urea (30 phr.) are dissolved in water by heating the admixture of 80° C. Next, 0-25 phr. of a surface active agent consisting of, in a 1 to 1 molar ratio, sorbitan-mono-oleate and sorbitan-tri-oleate, are added and mixed in a conventional basket type homogenizer using 4000 r.p.m. for the stirring rate.

The fire-retardant agent so formed is then coated onto the two untreated planar surfaces of a raw core of Philippine mahogany 2.0 mm. thick, at a rate of 400 g./m.² by roll spreader with showers and is dried for about 15 hours.

A glue is formed from an amino type resin (100 phr.) composed of the co-condensation product of urea and melamine and a water soluble phenol resin (10 phr.) admixed with walnut shell flour (10 phr.) and crude barley power (5 phr.) with stirring. As an alternative glue, 78.8 phr. formalin with 37% concentration is adjusted so that its pH value at 7.0-8.0 with 1.6 N caustic soda, stirred while heating at 65-70° C. with 14.1 phr. melamine being reacted at 80-85° C. until 180-200 water miscibility is obtained, then again adjusted to a pH of 10-11 by 6 N caustic soda and 3.7 phr. phenol is added and allowed to react for 2.5-3 hours at 70-80° C. To this co-condensation resin (100 phr.) after cooling to room temperature is added walnut shell flour (100%) and crude barley powder (15 phr.) as extender and 25 (phr.) water, with stirring to yield a glue.

Either glue is then coated at a rate of 305-327 g./m.² by rollspreader on the two surfaces of the core previously treated with the fire-retardant composition as described. A face and back veneer of Philippine mahogany 0.65 mm. thick are glued thereon and pressed at a temperature of 125-130° C.

The so formed plywood exhibits good fire-retardant properties and exhibits adhesive strengths which meet U.S. Commercial Standard Cs 45-60 and Cs 35-61 (U.S. Department of Commerce) not only for Interior Type but Exterior Type plywood as well. Furthermore, there is no significant change in strength when the plywood is subjected to a conventional accelerated aging test after 100 hours using a conventional weatherometer, thus evidencing the lack of any appreciable amount of lignum disintegration caused by treating the plywood with the fire-retardant composition.

EXAMPLE 3

A fire-retardant composition is prepared in the following manner:

Ammonium bromide or ammonium iodide (10 phr.), ammonium sulfate (2.5 phr.), zinc chloride (10 phr.), boric acid (2.5 phr.) and urea (25 phr.) are mixed and powdered and added to 3 phr. water to form a solution by stirring and heating at 80° C. The hot solution is gradually poured with stirring into an aqueous solution of 2.5 methyl cellulose to which is added allylsulfonamide (5 phr.) to give stability and spinability, if necessary. Thereafter tricresylphosphate or glycerine phosphate (10 phr.) or guanidine phosphate (17 phr.) is added. While stirring, the mixture is cooled to room temperature and a paste-type fire-retardant agent is formed.

A raw core of Philippine mahogany of 4.0 mm. thick is pre-treated with a deliquescent agent of 10% ammonium chloride aqueous solution to maintain its moisture content between about 80-150%. The core was previously scarred by use of a rotary lathe to provide a roughened surface.

This pre-treated core is then coated with the fire-retardant paste on both of its planar surfaces using a roll-spreader set at a rate of 195-260 gm./m.². The core is then allowed to stand for 15 hours to insure complete permeation of the composition into the lignin structure. The thus treated core is dried in a low frequency electric drier.

This core is next provided with untreated back and face veneers of Philippine mahogany of 0.65 mm. thickness and pressed under heat into a plywood structure as described in Example 2.

Several other cores were produced by the procedure and the averaged results of the total indicate the value of pretreatment to maintain the water content above the 80% level. On an average, without pretreatment, only 44% of cores coming out of a rotary lathe will have a water content of 80% or greater. On the other hand, with pretreatment the number rises to 86%. This is economically significant, scince as stated the maintenance of water content above 80% effects a more uniform and better permeation of the fire-retardant material thus increasing fire-retardancy. In addition, when paste is employed, 35-50% less fire retardant is needed when the moisture content is maintained above 80%.

EXAMPLE 4

Several plywood structures were formed in accordance with Example 2 using tricresylphosphate and ammonium bromide such that the ratio of phosphorus atoms to bromine atoms is 1:3. The plywood structures so formed were then subjected to the standard international fire-hazard test (as prescribed in J.A.S.) such that the heating test was forwarded along the heating-rate curve prescribed by these tests. The heating rate employed was 100° C. per minute. The radiant energy on the surface of the sampler was 0.7 watts per cm.$^2$ at 450° C. The following test results were observed:

monium chloride solution, the core is pretreated with a liquid mixture consisting of 10 phr. sodium silicate, 27

TABLE A

| Experiment number | Thickness, mm. | Ignition time, $t_1$ (min. sec.) | Ignition temp., $t_1$ (° C.) | Exting. time, $t_2$ (min. sec.) | Exting. temp., $T_2$ (° C.) | Self exting. ability | Flame duration, $D_t$ (sec.) | Layer dimensions [2] (mm.) | Wt. loss (percent) |
|---|---|---|---|---|---|---|---|---|---|
| 1 [1] | 4.0 | | 380 | ∞ | 800 | Negative | ∞ | 0.75+2.8+0.75 | ∞ |
| 2 [1] | 5.5 | | 380 | ∞ | 800 | Negative | ∞ | 0.98+4.0+0.98 | ∞ |
| 3 | 4.0 | 5.28 | 380 | 5.54 | 590 | Positive | 26 | 0.75+2.8+0.75 | 22.3 |
| 4 | 5.5 | 5.45 | 400 | 6.10 | 500 | Positive | 25 | 0.98+4.0+0.98 | 17.4 |
| 5 | 7.0 | 5.40 | 410 | 6.07 | 590 | Positive | 27 | 0.75+1.95+1.95 +0.75 | 12.4 |
| 6 | 9.0 | [3] >6.3 | | | | No ignition | 0 | 0.75−4.0+1.95+4.0 +0.75 | 10.0 |
| 7 | 11.0 | [3] >6.3 | | | | No ignition | 0 | 0.98+4.0+2.8+4.0 +0.98 | 2.7 |

[1] Experiments 1 and 2 were untreated structures for controls.
[2] Underlined dimensions are treated cores, non-underlined dimensions are untreated veneers or cores, dimensions are listed in the order of their layering.
[3] Small flash.

EXAMPLE 5

A viscosity building component is first formulated by admixing with mastication, methyl cellulose (0.3 phr.), cellulose glycol acid soda (0.5 phr.) and water (17 phr.), fine grained ammonium sulfate (2.5 phr.) and boric acid (2.5 phr.). Next a translucent solution is prepared which has the ability not only to lend fire-retardance to plywood, but which also reduces the hydroscopicity of the core. This solution is prepared by initially heating 10 phr. zinc chloride, 10 phr. ammonium bromide and 35 phr. of urea or thio urea, under anhydrous conditions at 140° C. to form a polymerizate. The polymerizate so formed is then dissolved in 17 phr. of dimethylsulfoxide. The viscosity builder and solution of polymerizate are then added together along with 10 phr. of an organophosphorous compound such as tricresyl-phosphate, trioctylphosphate, tributyl phosphate, guanidine phosphate (17 phr.) or glycerin-phosphate, or an organosulfuric compound such as ammonium sulfamate or those of the formula $(RO)_2SO_2$ as defined hereinabove. Also added are 0.2 phr. of an equi-molar mixture of sorbitan-monooleate and sorbitan-tri-oleate. 0.5 phr. of allylsulfonamide may also be added to provide stability and spinnability. The product so formed is an excellent fire-retardant paste which may be applied at rates of about 100–180 g./m.$^2$ and dried for 7 hours prior to gluing on the veneers.

EXAMPLE 6

A fire-retardant paste similar to that of Example 5 is produced, except that dimethylsulfoxide is replaced by 55 phr. of a 37% aqueous solution of formaldehyde. The same good antihygroscopic and fire-retardant properties are obtained.

EXAMPLE 7

A fire-retardant paste composition is prepared as set forth in Example 2 except that instead of an organophosphorus compound, there is employed ammonium sulfamate.

EXAMPLE 8

The procedure of Example 3 is followed except that instead of pretreating the core with a 10% aqueous ammonium chloride solution, the core is pretreated with a liquid mixture consisting of 10 phr. sodium silicate, 27 phr. ammonium sulfate and 400 phr. water. Excellent fire-retardant properties are found to exist in the core so produced.

EXAMPLE 9

The procedure of Example 3 is followed except that with the 10% aqueous ammonium chloride pretreatment there is additionally employed a pretreating liquid consisting of composition B in Example 1 applied by roll-spreader at a rate of 200–250 g./m.$^2$ with a drying time of 10 hours. The resulting plywood laminate is fire-retardant.

EXAMPLE 10

A typical procedure employed for forming fire-retardant plywood structures according to this invention is set forth as follows:

| Process step | Apparatus | Operating conditions |
|---|---|---|
| 1. Rotary lathe core | Lathe | |
| 2. Tenderize | Tenderize 10″ D | 70 m./min. |
| 3. Pretreatment (if any): (a) w/o silicate (b) with silicate | Roll spreader 10″ D | 70 m./min. (a) Deliquescent (e.g. 15% aqueous urea and NH$_4$Br). (b) Example 1. |
| 4. Stacking | Stacks | 10–20 hrs. at 20–25° C. |
| 5. Fire-retardant treatment | Roll spreader 10″ D | 70 m./min., 230 g./m.$^2$ at 40° C. |
| 6. Stacking-drying | Stacks | 20 hrs. at 25° C. |
| 7. Final drying | Roll dryer | 160° C., 20–25 min. to get below 10% moisture content. |
| 8. Gluing | Roll spreader 10″ D | 80 m./min., 270 g./m.$^2$ |
| 9. Plying process | Hot press | 130° C., 10 kg./cm.$^2$, 2 min. |

EXAMPLE 11

A fire-retardant composition is formulated from a previously prepared polymerizate (30 phr.), dimethylsulfoxide (30 phr.) and a 37% aqueous solution of formaldehyde (50 phr.). The mixture also includes a viscosity builder such as that described in Example 5 and an organophosphate or sulfate as described hereinabove. In this instance, however, the polymerizate also includes an organophosphate and is formed by admixing and heating at 140° C. 10 phr. zinc chloride, 10 phr. ammonium bromide, 30 phr. urea and 10 phr. glycerine phosphate or guanidine phosphate.

In those examples given above which employ either dimethyl sulfoxide or formaldehyde, or both, it has been found that the weight gain, due to moisture pick-up, of the plywood structure is about 10% in 60 hours under 96% relative humidity with no appreciable increase after 60%. In other words, the plywood structure behaves as untreated plywood does. On the other hand, plywood structures treated with conventional fire-retardant compositions as discussed above usually experience a weight gain due to moisture pick-up of about 16% in 60 hours under 96% relative humidity which does not reach equilibrium (i.e. weight gain continues) at the end of this period. The compositions of this invention, then, which employ dimethylsulfoxide or formaldehyde, truly overcome the detrimental hygroscopic problem in the prior art. In addition, the use of these two additives, either singularly or together, can increase permeation efficiency to the extent that from about 55–75% less composition need be employed to achieve the same results.

Once given the above disclosure many other features, modifications, and improvements will become apparent to the skilled artisan. Such other features, modifications and improvements are therefore considered a part of this invention, the scope of which is to be determined by the following claims.

We claim:

1. A fire-proof wood structure comprising at least one inner plywood core and further defined by at least one outer veneer, said inner plywood core first impregnated with a silicate compound which decomposes to make a glassy polymer selected from the group consisting of sodium silicate, ethoxysilanol, butoxysilanol and tertiary-butoxysilanol and an ammonium salt, and thereafter treated with a fire-retardant composition comprising a urea compound selected from the group consisting of urea, thiourea, dimethyl thiourea and monomethylolmelamine; an ammonium halide; an organo-phosphorous compound or an organo-sulfuric compound capable of generating a vapor pressure from pyrolysis above about 400° C.; a metal halide wherein said metal has a valence of 2 or 3; a sulfate compound; and a weak acid compound.

2. A fire-proof wood structure as defined in claim 1, wherein said silicate compound is used in an amount of about 1 to 22 parts by weight per 100 parts by weight of said fire-retardant composition later applied.

3. A fire-proof plywood structure as defined in claim 1, which includes at least one inner plywood core and at least two outer veneers.

4. A process of forming a fire-proof wood structure as defined in claim 1, comprising first treating said core with a silicate compound as defined in claim 1 and an ammonium salt, and thereafter treating said core with a fire retardant composition comprising reacting an ammonium halide, a metal halide and a urea compound with a sulfoxide compound such as a dialkyl sulfoxide to form an anhydrous sulfoxide reaction solution and adding an aqueous solution of the remaining components of said fire-retardant composition as defined in claim 1.

References Cited

UNITED STATES PATENTS

| | | | |
|---|---|---|---|
| 2,632,743 | 3/1953 | Eckert | 260—17.3 |
| 3,087,836 | 4/1963 | Dearborn | 117—136 |
| 3,398,019 | 8/1968 | Langgoth et al. | 117—138 |
| 3,409,550 | 11/1968 | Gould | 250—8.1 |
| 3,201,265 | 8/1965 | Hodnefield | 106—15 |
| 3,383,240 | 5/1968 | Hirshfeld | 106—15 FP |
| 3,676,389 | 7/1972 | Putnam et al. | 106—15 FP |

GEORGE F. LESMES, Primary Examiner

W. R. DIXON, JR., Assistant Examiner

U.S. Cl. X.R.

106—15 FP; 117—57, 137, 113, 116; 161—269, 403; 252—8.1